Dec. 12, 1933.                 O. W. LIVINGSTON                  1,939,455
                    ELECTRIC POWER CONVERTING APPARATUS
                       Original Filed Nov. 21, 1930
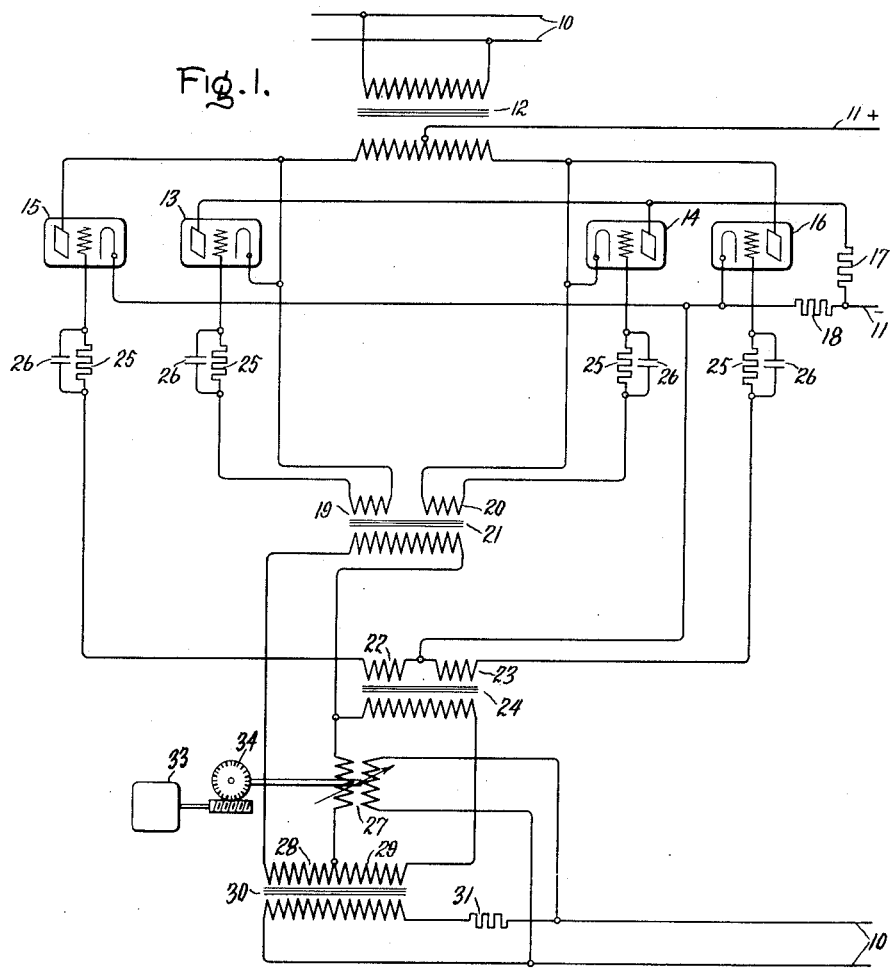
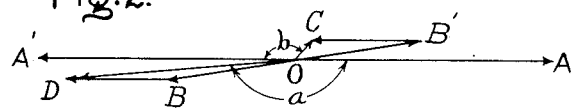
Inventor:
Orrin W Livingston,
by Charles E. Tulla
His Attorney.

Patented Dec. 12, 1933

1,939,455

UNITED STATES PATENT OFFICE 1,939,455

ELECTRIC POWER CONVERTING APPARATUS

Orrin W. Livingston, Schenectady, N. Y., assignor to General Electric Company, a corporation of New York Application November 21, 1930, Serial No. 497,259
Renewed May 3, 1933

8 Claims. (Cl. 172—281)

My invention relates to electric power converting apparatus and more particularly to such apparatus utilizing electric valves for transmitting energy from an alternating current supply circuit to a direct current load circuit or an alternating current circuit of a lower frequency.

Heretofore it has been proposed to control the output of a rectifier, including grid controlled electric valves, from substantially zero to its maximum power output by shifting the phase of the grid potentials of the valves with respect to the anode potentials through 180°. However, if the grid potential be advanced or retarded beyond this 180° limit, the rectifier will deliver its maximum power output for each 180° phase shift on each side of this control limit. In some cases it is desirable to provide a rectifying circuit by means of which the direct current output may be varied from zero to maximum in either direction.

It is an object of my invention to provide an improved electric power converting apparatus including electric valves for transmitting energy from an alternating current supply circuit to a direct current load circuit in which the direct current output may be varied from zero to a maximum in either direction.

It is a further object of my invention to provide an improved electric power converting apparatus including electric valves for transmitting energy from an alternating current circuit of one frequency to another circuit of lower frequency.

It is a further object of my invention to provide an improved phase shifting circuit which is of general application, but which is particularly suitable for controlling electric valves in my improved rectifier circuit and which is capable of deriving from a source of alternating potential two potentials either of which may be maintained substantially constant in phase with respect to that of said source, while the other may be varied through substantially 180°.

In accordance with my invention I provide the usual power transformer and a pair of electric valves connected between the outer terminals of the secondary winding of the transformer and the negative side of the direct current circuit, while the positive side of the direct current circuit is connected to the midpoint of the secondary winding of the transformer. In addition, there is another pair of electric valves connected in parallel and in opposition to the first valves. An improved grid circuit is provided for these valves by means of which the grid potentials of one pair of valves are maintained substantially out of phase with their anode potentials while the phase of the grid potentials of the other pair of valves may be varied over substantially 180°. This improved phase shifting arrangement comprises a transformer provided with a pair of secondary windings and a primary winding connected across the alternating current circuit through a phase advancing resistor. An induction regulator is also provided with its primary winding connected across the alternating current supply. There is associated with each pair of electric valves a grid transformer having a primary winding energized from one of the secondary windings of the above-mentioned transformer and the secondary winding of the induction regulator. In order to control the output of direct current the rotor of induction regulator may be turned by any desired means, while if it is desired to deliver a low frequency alternating current, the rotor of the induction regulator may be motor-driven at a suitable speed.

For a better understanding of my invention together with other and further objects thereof, reference is had to the following description taken in connection with the accompanying drawing and its scope will be pointed out in the appended claims. Fig. 1 of the accompanying drawing is a diagrammatic representation of one embodiment of my invention for controlling the amount of energy supplied by an alternating current circuit to a direct current circuit from zero to maximum in either direction or for generating a low frequency alternating current, while Fig. 2 is a vector diagram to aid in the understanding of the invention.

Referring now more particularly to Fig. 1 of the drawing I have illustrated an arrangement for receiving energy from an alternating current circuit 10, converting it into direct current and delivering it to a load circuit 11. This apparatus comprises a transformer 12 provided with a primary winding connected to the alternating current supply circuit 10 and with a secondary winding having an electrical midpoint connected to the positive direct current line 11. Between the outer terminals of the secondary winding of transformer 12 and the negative direct current line are connected two pairs of electric valves 13—14 and 15—16 respectively. These two pairs of electric valves are oppositely connected and there is preferably included in their common connection to the negative direct current line 11, resistors 17 and 18, respectively. Electric valves 13 to 16 inclusive, are each provided with an anode, a cathode and a control grid, and are preferably of the vapor electric discharge type in which the starting of current in the valve is determined by the potential upon its control grid but in which current through the valve may be interrupted only by reducing its anode potential below the critical value. Grid circuits are provided for electric valves 13 and 14 including oppositely connected secondary windings 19 and 20, respectively, of a grid transformer 21, while the grid circuits of electric valves 15 and 16 include oppositely connected secondary windings 22 and 23 of a grid transformer 24. Current limiting resistors 25 are connected in series with the grids, while in some cases it may be found desirable to connect capacitors 26 in parallel to the current limiting resistors 25. The primary circuits of grid transformers 21 and 24 include the secondary winding of an induction regulator 27, the primary winding of which is connected across the alternating current circuit 10, and oppositely connected secondary windings 28 and 29 of a transformer 30, the primary winding of which is connected across the circuit 10 through a phase advancing resistor 31. In some cases it may be found desirable to continuously rotate the secondary member of induction regulator 27 by means of a motor 33 and driving mechanism 34.

The operation of the above described apparatus will be clearly understood by considering electric valves 13 and 14 together with the transformer 12 and electric valves 15 and 16 and the transformer 12 as two independently controlled rectifiers. The phase of the grid potentials of one pair of electric valves is maintained substantially out of phase with their anode potentials so that only one pair of valves is active at any given instant. The general principle of operation of the controlled rectifier is so well understood by those skilled in the art that a detailed explanation is not considered necessary. In general, when the grid potentials of the electric valves are in phase with their anode potentials the valves are fully conducting and full wave rectified current is delivered to the receiving circuit 11. By retarding the phase of the grid potential with respect to the anode potentials, the point in a cycle of anode potential at which a valve is made conducting is varied and thus the average current delivered by the valves is controlled as desired.

The manner in which a potential is obtained for maintaining one pair of valves non-conducting while a potential variable in phase with respect to the supply potential for controlling the other pair of valves will be more clearly understood by reference to Fig. 2, which is a vector diagram of the potentials applied to a single valve of each of the pairs. Obviously the same diagram is applicable to the other valves of the two pairs by reversing the phase relation. In this diagram the vector OA represents the potential applied to the anode of one of the electric valves, for example valve 15, while the vector OA' represents the potential applied to the anode of electric valve 14. The resistor 31 slightly advances the phase of the potential applied to the primary winding of transformer 30 from the circuit 10. The potential vectors of the secondary windings 29 and 28 of the transformer 30 are represented by the vectors OB and OB', respectively, while the vectors BD and B'C each represent the potential supplied by the secondary winding of the induction regulator 27, these latter potentials being at all times either in phase with the potential of the circuit 10 or in phase opposition as will be well understood by those skilled in the art, only the magnitude of these potentials being varied. The potential applied to the grid of electric valve 15 from the secondary winding 22 of the grid transformer 24, is thus the resultant of the vectors OB and BD, that is, the vector OD, which lags behind the anode potential OA by the phase angle $a$ which is equal to substantially 180°. At the same time the potential applied to the grid of electric valve 14 from the secondary winding 20 of grid transformer 21 is the resultant of vectors OB' and B'C, that is, the vector OC which lags behind the anode potential of the valve 14 represented by the vector OA' by the phase angle $b$. It will be apparent from consideration of the diagram of Fig. 2 that as the magnitude of the vectors BD and B'C is varied by the variation of the setting of the induction regulator 27 that the vector OD will at all times lag the anode potential OA by substantially 180°, the limiting positions being represented by the vectors OB and OA', respectively. Hence, electric valve 15, and with it, associated valve 16, will be maintained substantially non-conducting during its respective half cycle. However, at the same time, as the vector B'C is increased, it is seen that the phase angle $b$ between the vector OC and the vector OA' changes rapidly; that is, the phase of the grid potential applied to electric valve 14 is advanced. As the magnitude of the potential derived from the induction regulator 27 is increased the same relations will of course obtain with respect to electric valve 13. In short, as the potential induced in the primary circuits of grid transformers 21 and 24 by means of induction regulator 27 is increased in magnitude in the direction indicated by the diagram in Fig. 2, electric valves 15 and 16 are maintained substantially non-conducting while the grid potentials of electric valves 13 and 14 gradually advance from substantially 180° lagging until they are substantially in phase with the anode potentials of these valves so that they are fully conducting. If the induction regulator is so adjusted as to induce a potential in the primary circuits of grid transformers 21 and 24 of an opposite polarity, it is clear that electric valves 13 and 14 will be maintained substantially non-conducting as the magnitude of this potential increases, while the phase of the grid potentials of the valves 15 and 16 will be gradually advanced, thus gradually increasing the output delivered by the apparatus to the receiving circuit 11 in a direction opposite that indicated by the plus and minus symbols of Fig. 1. When the potential supplied by the induction regulator 27 is substantially zero the grid potentials of all the valves lag their anode potentials by approximately 180°. By the addition of the resistors 25 and capacitors 26 in the grid circuits, a small negative bias is obtained in these grid circuits which is sufficent to overcome the small initial portion of the grid potentials which would otherwise tend to render the valves conducting during a small final portion of the half cycles of positive anode potential due to the fact that the grid potentials are not completely 180° out of phase with their anode potential so that all of the valves are maintained completely non-conducting and no energy is delivered to receiving circuit 11.

However, I do not claim as my invention the broad feature of selectively energizing a direct current circuit with either polarity by means of two groups of reversely connected electric valve rectifiers, for this feature is disclosed and broadly claimed in the copending application of B. D. Bedford, Serial No. 485,335, filed September 29, 1930, while the particular arrangement for producing and combining dephased voltages supplied to the grid circuits of the electric valves is disclosed and claimed in the copending application of Lewin and Jontz, Serial No. 589,960, filed January 30, 1932, both assigned to the same assignee as the present application.

In certain cases it may be desirable to reverse periodically the polarity of the current delivered to the circuit 11. This may be done by driving the rotating member of the induction regulator 27 by means of an electric motor 33 and driving mechanism 34. The electric motor obviously may be of any desired type. For instance, it may be a direct current motor the speed of which can be easily controlled to determine the frequency at which the polarity of the circuit 11 is reversed, or it may be a synchronous motor driven from an alternating current line to which it is desired to supply power, in which case the apparatus operates as a frequency changer receiving energy of one frequency from the circuit 10 and delivering it at another frequency to the circuit 11. When operated in this way it will be found most desirable to have the frequency of the circuit 10 an integral multiple of that of the circuit 11.

In a case where the apparatus is to be used in rapidly reversing a highly inductive load, such for example, as the field winding of a dynamo electric machine, the pair of valves which are being rendered non-conducting will still continue to conduct for a short interval after the other valves are rendered conducting. In order to prevent a short circuit across the outer terminals of the secondary winding of the transformer 12, resistors 17 and 18 are connected in the output circuit of the valves 13, 14 and 15, 16, respectively.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:—

1. In combination, an electric translating circuit including two pairs of oppositely connected electric valves, each provided with an anode, a cathode, and a control grid, and means for controlling the flow of current in said circuit including means for maintaining the grid potentials of one pair of valves substantially out of phase with the anode potentials of these valves and simultaneously shifting the phase of the grid potentials of the other pair of valves with respect to their anode potentials.

2. In combination, an alternating current supply circuit, a direct current load circuit, and means for transmitting energy from said supply circuit to said load circuit including two pairs of electric valves each provided with an anode, a cathode, and a control grid, grid circuits for each of said valves including sources of alternating potential, and means for maintaining the grid potentials of either pair of valves substantially out of phase with the potential of the alternating current circuit and shifting the phase of the grid potentials of the other pair of valves.

3. Apparatus for deriving from a source of alternating potential two potentials, the phase of one of which remains substantially constant with respect to that of said source while the phase of the other is variable comprising means for producing two potentials opposite in phase, one of which differs in phase from that of said source by a relatively small phase angle, and means for adding to each of said oppositely phased potentials a potential in phase with that of said source and variable in magnitude.

4. Apparatus for deriving from a source of alternating potential two potentials, the phase of either of which remains substantially constant with respect to that of said source while the phase of the other is variable comprising means for producing two potentials opposite in phase, one of which leads the potential of said source by a relatively small angle, and means for adding to each of said oppositely phased potentials a potential variable in magnitude and in vectorial alignment with that of said source.

5. Apparatus for deriving from a source of alternating potential two potentials, the phase of one of which remains substantially constant with respect to that of said source while the phase of the other is variable comprising a transformer having a primary winding and a pair of oppositely connected secondary windings, said primary winding being connected across the source through a device for producing a relatively small phase displacement, an induction regulator provided with a secondary winding and a primary winding connected across the source, and a pair of load circuits, each including one of said transformer secondary windings and the secondary winding of said induction regulator.

6. In combination, an alternating current supply circuit, a direct current load circuit, rectifying means for transmitting energy from said supply circuit to said load circuit including two pairs of oppositely connected electric valves each provided with a control grid, a transformer having a pair of secondary windings and a primary winding, a resistor, said primary winding being connected across said supply circuit through said resistor, an induction regulator having a secondary winding and a primary winding connected across said supply circuit, and grid circuits for each of said valves each including a potential derived from one of said transformer secondary windings and a potential derived from said induction regulator secondary winding.

7. In combination, an alternating current supply circuit of one frequency, an alternating current load circuit of another frequency, means for transmitting energy from said supply circuit to said load circuit including a plurality of electric valves, means for maintaining one group of said valves non-conducting and simultaneously varying the conductivity of the other of said valves during one interval of time and for maintaining said last mentioned valves non-conducting and simultaneously varying the conductivity of said one group of valves during a succeeding interval of time, and means for repeating the cycle of said conductivity controlling means at a predetermined frequency.

8. In combination, an alternating current supply circuit of one frequency, an alternating current load circuit of another frequency, means for transmitting energy from said supply circuit to said load circuit including two pairs of electric valves, each provided with an anode, a cathode, and a control grid, grid circuits for each of said valves including sources of alternating potential, means for maintaining the grid potentials of either pair of valves substantially out of phase with the potential of the supply circuit and simultaneously shifting the phase of the grid potentials of the other pair of valves, and means for repeating the cycle of the conductivity controlling means at the frequency of the load circuit.

ORRIN W. LIVINGSTON.